July 5, 1955 J. W. BROWN, JR 2,712,438
HEAT EXCHANGER
Filed April 27, 1951
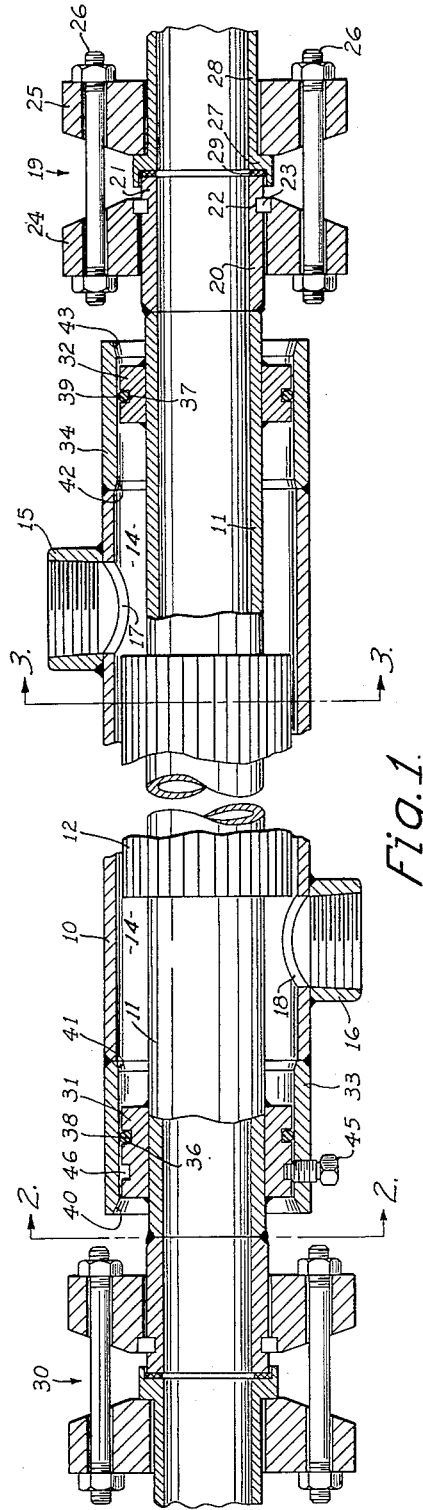
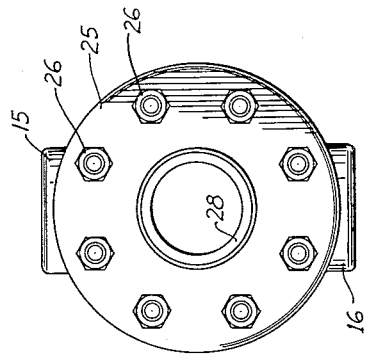
Fig. 4.
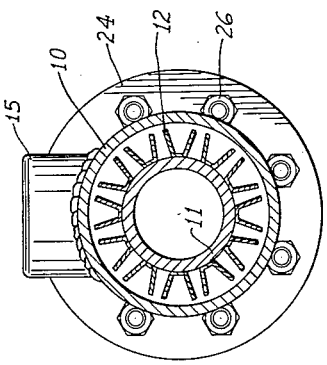
Fig. 3.
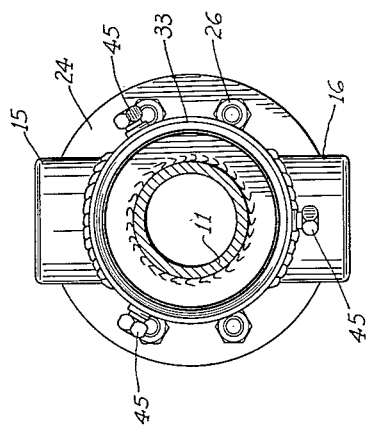
Fig. 2.
INVENTOR.
JOHN W. BROWN, JR.
BY Bosworth & Sessions
ATTORNEYS.

United States Patent Office 2,712,438
Patented July 5, 1955

2,712,438

HEAT EXCHANGER

John W. Brown, Jr., Lakewood, Ohio, assignor to Brown Fintube Company, Elyria, Ohio, a corporation of Ohio Application April 27, 1951, Serial No. 223,300

3 Claims. (Cl. 257—246)

This invention relates to heat exchangers and more particularly to heat exchangers of the type embodying an inner tube and an outer or shell tube, the two tubes defining an annular space for receiving a fluid.

In heat exchangers of this general type, it is essential to block or seal the ends of the annular space, in other words, to make a fluidtight connection between the ends of the inner tube and the ends of the outer tube. The present invention relates primarily to the construction and arrangement of such seals or connections and a general object of the present invention is the provision of a heat exchanger in which the required connections can be made simply by inserting the inner tube within the outer tube. Another object of the invention is the provision of such a heat exchanger in which the fluid pressures acting to move the inner tube longitudinally with respect to the outer tube are substantially balanced so that there is no need for heavy bolting flanges and the like to retain the inner tube in place. Another object is the provision of heat exchangers in which the seals between the outer and inner tubes are made by conventional O-ring seals.

Further objects and advantages of the invention will become apparent from the following description of a preferred form thereof, reference being made to the accompanying drawing in which Figure 1 is a longitudinal cross-section illustrating a heat exchanger made according to my invention; Figure 2 and Figure 3 are transverse sections through the heat exchanger of Figure 1 taken along the lines 2—2 and 3—3 of Figure 1; and Figure 4 is an end view of the exchanger.

Briefly, a heat exchanger made according to a preferred form of my invention comprises an outer or shell tube and an inner tube concentric therewith. The ends of the inner tube are provided with bushings or annular end plugs which are dimensioned to fit closely within the adjacent ends of the shell tube, and the small clearance spaces between the bushings and the shell tube are sealed by resilient sealing members such as conventional O-ring seal disposed in grooves in one of the members. Inasmuch as the diameters of the bushings at opposite ends of the inner tube are equal, the hydraulic pressures on the bushings are substantially equal except for differences due to the pressure drop of the fluid flowing through the exchanger; hence, there are no large forces tending to move the inner tube longitudinally with respect to the outer tube. Accordingly, it is sufficient to lock one of the bushings against movement with respect to the outer tube by means such as comparatively small screws extending through the wall of the shell tube into a groove in the bushing, while the other bushing need not be secured against longitudinal movement in any way, being permitted to float to accommodate changes in the length of the parts due to changes in temperature.

Referring now to the drawings, the shell tube of a preferred form of my heat exchanger is indicated at 10 and the inner tube at 11. The inner tube 11 preferably is provided with a number of radially extending fin members 12. These may be constructed and arranged as described in my Patent No. 2,261,137 issued November 4, 1941. The provision of such fins gives extended heat exchange surface and increases the efficiency of the exchanger. The outer edges of the fins, as shown particularly in Figure 3, extend into close proximity with the inner surface of the shell tube 10. The shell tube and the inner tube together define an annular space 14. In order to provide for circulation of fluid through the annular space, the shell tube 10 has inlet and outlet fittings 15 and 16 respectively, these fittings communicating with openings 17 and 18 in the wall of the tube.

The other heat exchange fluid flows through the interior of the inner tube 11; any convenient type of fitting or connection may be employed to connect the inner tube to external conduits so long as at least one of the fittings on the ends of the inner tube is of such diameter that it can be drawn through the shell tube in order to make it possible to assemble and disassemble the heat exchanger. Ordinary screw threads, conventional couplings, or for example, a fitting 19 such as shown at the right hand end of Figure 1, may be employed. This fitting comprises a tubular extension 20 welded or otherwise suitably secured to the end of the tube 11, and having an end portion 21 and a groove 22. The groove 22 receives a split locking ring 23 which, in turn, is engaged by the bolting ring 24. The bolting ring 24 provides means whereby the connecting ring 25 may be drawn up by means of bolts 26 to bring the flanged end 27 of the connecting pipe 28 into sealing engagement with the end 21. If desired, a sealing gasket 29 may be employed in this connection. A similar fitting 30 may be employed at the other end of the inner tube 11, or any other convenient means may be utilized to connect the end of the tube to an external conduit.

In order to enclose the annular space between the shell tube 10 and the inner tube 11, bushings 31 and 32 are secured to the inner tube by welding, brazing, or the like, adjacent to ends of the heat exchanger. These bushings are dimensioned to fit closely within the adjacent inner surfaces of the shell tube and support the inner tube concentrically with the shell tube.

In order to provide an accurate fit between the bushings and the shell tube and proper internal sealing surfaces on the shell tube, the end portions of the shell tubes are preferably constituted by extension sleeves 33 and 34 welded to the ends of the central portion of the shell tube 10. These sleeves have machined inner surfaces dimensioned to fit closely about the outer surfaces of the bushings 31 and 32; the sleeves are employed because the accuracy and finish of commercial tubing, such as used to construct the central portion of shell tube 10, are not adequate to provide a proper seal. Under some circumstances, however, it is contemplated that the tubing itself may be utilized to provide the sealing surface, either with or without machining or surface finishing operations to give the required accuracy and quality of surface.

In order to seal the small clearance spaces between the bushings and their adjacent extension sleeves, the bushings are preferably provided with grooves 36 and 37 which receive resilient sealing members composed of rubber-like material (by the term rubber-like material, I intend to include natural and synthetic materials having rubber-like characteristics). Preferably, the sealing members take the form of conventional O-ring seals 38 and 39 and, preferably, where high temperatures are to be expected to be encountered in service, the O-rings are compounded with heat resistant rubber-like materials such as silicones. With this construction, it will be evident that the inner tube is sealed at both its ends to the outer tube and the ends of the annular space are effectively blocked simply by inserting the inner tube into its proper position within the outer tube with the sealing members 38 and 39 in place.

In order to facilitate entry of the inner tube and sealing members into the outer tube, the ends of the sleeve extensions 33 and 34 are beveled as at 40 and 41, and 42 and 43 respectively. The O-rings are dimensioned to resiliently engage both the bases of the grooves in which they are disposed and the inner surfaces of the surrounding sleeves. The pressure of engagement of the O-rings with these surfaces is increased as they are subject to fluid pressure. Hence, a reliable and leakproof packing is provided. In the drawing, each bushing is shown as having only a single groove and a single O-ring. Obviously, two or more grooves and O-rings can be provided in each bushing where service conditions are exceptionally severe.

It will be noted that the bushings 31 and 32, and sleeves 33 and 34 are of the same diameter; thus, the areas of bushings 31 and 32 are equal and the areas subject to the pressure of fluid within the annular space 14 are equal. Therefore, the pressures acting on the bushings 31 and 32 and tending to blow them out of the shell tube are substantially equal; the only unbalanced forces are due to the fact that there is necessarily a slight pressure drop in the fluid flowing through the annular space from the inlet 15 to the outlet 16 with the result that the unit pressures on bushing 32 are slightly in excess of the unit pressures on bushing 31. The only force tending to move the inner tube longitudinally with respect to the outer tube is due to this unbalance. In order to resist this comparative slight unbalance and restrain the inner tube from movement with respect to the outer tube, I preferably employ locking screws 45 which are threaded through the wall of the extension sleeve 33 and extended into a groove 46 in bushing 31. These screws are disposed outside of the O-ring 38; hence, they do not need to be fluid tight. In order to permit expansion and contraction of the inner tube 11 with respect to the shell tube 10, the bushing 32 is not secured against movement in any way. Bushing 32, therefore, can float longitudinally with respect to sleeve extension 34, in which case O-ring 39 will simply slide along the inner surface of sleeve 34.

The bushings 31 and 32 and sleeves 34 are of simple construction and can be produced at relatively low cost. The bushings function to support the inner tube within the shell tube substantially concentrically therewith as well as to provide supports for the O-rings or other resilient sealing rings 38 and 39. The fittings 20 and 30 are of such diameter that they can be drawn readily through the exchanger simply by removing the split locking ring and the bolting ring. The outside diameter of the finned tube is slightly less than the internal diameter of the sleeve extensions 33 and 34; thus, the exchanger can be assembled without difficulty simply by inserting the inner tube within the outer tube. The parts can be assembled from either end if the fittings on both ends of the inner tube are smaller than the minimum internal dimensions of the shell and sleeve extensions, but so long as the fitting on one end of the inner tube is so constructed, the inner tube can readily be inserted within the shell. When the screws 45 are disconnected the inner tube can be moved with respect to the shell tube in either direction to make either O-ring accessible for inspection or replacement without disassembling the exchanger; preferably the sleeves 33 and 34 are of such length that each O-ring can be exposed beyond the adjacent end of the shell without disengaging the other O-ring from its associated sleeve.

Because of the substantial balancing of the forces due to hydraulic pressures within the exchanger, no heavy flanges are required to resist longitudinal movement of the inner tube and because of the nature of the seals employed, it is unnecessary to provide any bolting flanges or the like in the exchanger. Thus, the weight and bulk of the exchanger is reduced as compared with conventional types of exchangers. The cost of manufacture is reduced because of elimination of material and machining operations, and the installation and assembly of the exchanger is much simpler and more foolproof than in prior types of exchangers.

Persons skilled in the art will appreciate that various changes and modifications can be made in the preferred form of heat exchanger disclosed herein without departing from the spirit and scope of the invention.

I claim:

1. In a heat exchanger having an inner tube, a shell tube surrounding the inner tube and fluid connections for the ends of the inner tube of larger external diameter than said inner tube disposed outside of said shell tube, means for sealing said inner tube to said shell tube comprising sleeves constituting the end portions of said shell tube, said sleeves being permanently secured to the central portion of said shell tube, the internal diameter of said shell tube being at least as great as the internal diameter of said sleeves, said sleeves having finished cylindrical inner surfaces and the internal diameter of said sleeves being greater than the external dimensions of the fluid connections for the inner tube, bushings of larger external diameter than the fluid connections for the inner tube secured in leakproof relation to said inner tube and disposed within said sleeves, said bushings being of equal diameter and fitting closely within the cylindrical surfaces of said sleeves, each of said bushings having a groove and a resilient sealing ring composed of rubber-like material disposed in said groove and sealing the clearance space between the bushing and the adjacent sleeve, and means independent of the adjacent sealing ring for preventing one of said bushings from moving longitudinally with respect to its surrounding sleeve.

2. In a heat exchanger having an inner tube and a shell tube surrounding the inner tube, said tubes defining an annular space and said inner tube projecting beyond both ends of said shell tube, and fittings for connecting the ends of the inner tube to connecting pipes, means for sealing said inner tube to said shell tube comprising a pair of bushings each having a cylindrical surface of larger external diameter than said inner tube secured in leakproof relation to said inner tube, one of said bushings being disposed within each end portion of said shell tube, said end portions having finished cylindrical inner surfaces of equal diameter, said bushings fitting closely within said end portions, each of said bushings having a groove and a resilient O-ring sealing ring in said groove sealing the clearance space between the bushing and the adjacent end portion, the length of the finished surfaces of each of said end portions being such that the inner tube can be moved longitudinally in either direction a distance sufficient to expose one of said O-rings beyond the adjacent end of the shell tube without disengaging the other O-ring from its associated finished surface, the external diameter of at least one of said fittings being less than the internal diameter of said sleeves whereby said inner tube can be readily inserted into said shell tube, and detachable means for preventing one of said bushings from moving longitudinally with respect to the shell tube, the sealing action of said O-rings being independent of said detachable means.

3. In a heat exchanger having an inner tube and a shell tube surrounding the inner tube, said tubes defining an annular space and said inner tube projecting beyond both ends of said shell tube, means for sealing said inner tube to said shell tube comprising a bushing having a surface of larger external diameter than said inner tube secured in leakproof relation to said inner tube and disposed within each end portion of said shell tube, each end portion having an inner cylindrical sealing surface, said bushings fitting closely within said sealing surfaces of said end portions, each of said bushings having a groove and a resilient sealing ring in said groove sealing the clearance space between bushing and the sealing surface of the adjacent end portion, and detachable means independent of said sealing rings for preventing said inner tube from moving longitudinally with respect to the shell tube.

References Cited in the file of this patent

UNITED STATES PATENTS

| | | |
|---|---|---|
| 2,041,328 | Forbes | May 19, 1936 |
| 2,180,795 | Christensen | Nov. 21, 1939 |
| 2,274,233 | Dewald | Feb. 24, 1942 |
| 2,402,157 | Griswold | June 18, 1946 |
| 2,410,912 | Wenk | Nov. 12, 1946 |
| 2,417,249 | Griswold | Mar. 11, 1947 |
| 2,549,687 | Jack et al. | Apr. 17, 1951 |